US012754672B2

(12) United States Patent
Gangadhar et al.

(10) Patent No.: US 12,754,672 B2
(45) Date of Patent: Oct. 6, 2026

(54) DYNAMIC MANAGEMENT OF MEMORY READ REQUESTS

(71) Applicant: SK Hynix NAND Product Solutions Corp., Rancho Cordova, CA (US)

(72) Inventors: Sarvesh Varakabe Gangadhar, San Jose, CA (US); Mark Anthony Golez, Folsom, CA (US); Jacky Le, Vancouver (CA)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 18/903,901

(22) Filed: Oct. 1, 2024

(65) Prior Publication Data

US 2025/0021231 A1 Jan. 16, 2025

Related U.S. Application Data

(63) Continuation of application No. 18/092,007, filed on Dec. 30, 2022, now Pat. No. 12,118,215.

(51) Int. Cl.
*G06F 3/06* (2006.01)

(52) U.S. Cl.
CPC .......... *G06F 3/0611* (2013.01); *G06F 3/0659* (2013.01); *G06F 3/0685* (2013.01)

(58) Field of Classification Search
CPC .... G06F 3/0611; G06F 3/0659; G06F 3/0685; G06F 3/061; G06F 3/0679; G06F 2212/1016
USPC .......................................................... 711/154
See application file for complete search history.

(56) References Cited

U.S. PATENT DOCUMENTS

| | | | | |
|---|---|---|---|---|
| 9,870,157 | B2 * | 1/2018 | Halaharivi | G06F 3/0659 |
| 12,118,215 | B2 | 10/2024 | Gangadhar et al. | |
| 2017/0185319 | A1 * | 6/2017 | Kim | G06F 3/061 |
| 2019/0222649 | A1 | 7/2019 | Cheng et al. | |
| 2020/0050395 | A1 | 2/2020 | Bavishi et al. | |
| 2020/0065024 | A1 * | 2/2020 | Park | G06F 3/0688 |
| 2021/0240389 | A1 | 8/2021 | Sela et al. | |
| 2021/0303206 | A1 | 9/2021 | Saxena et al. | |
| 2022/0137998 | A1 | 5/2022 | Kim et al. | |

(Continued)

OTHER PUBLICATIONS

Gangadhar et al., Non-Final Office Action, U.S. Appl. No. 18/092,007, Mar. 25, 2024, 15 pgs.

(Continued)

*Primary Examiner* — Hua J Song
(74) *Attorney, Agent, or Firm* — Morgan, Lewis & Bockius LLP

(57) ABSTRACT

This application is directed to dynamic management of memory read request in a memory system of an electronic device. The electronic device identifies a queue of memory access requests to access the memory system. The queue of memory access requests including at least one host read request and a current system read request. The electronic device monitors a workload condition of the memory system based on the queue of memory access requests, and generates at least a first system read request and a second system read request from the current system read request based on the workload condition of the memory system. The queue of memory access requests is updated by inserting the at least one host read request after the first system read request and before the second system read request.

19 Claims, 10 Drawing Sheets

(56) References Cited

U.S. PATENT DOCUMENTS

| | | | |
|---|---|---|---|
| 2022/0179798 | A1 | 6/2022 | Bavishi |
| 2022/0334972 | A1 | 10/2022 | Vijayrao et al. |
| 2022/0398035 | A1 | 12/2022 | Thokala et al. |

OTHER PUBLICATIONS

Gangadhar et al., Notice of Allowance, U.S. Appl. No. 18/092,007, Aug. 14, 21024, 5 pgs.
SK Hynix Nand Product Solutions Corp., International Search Report and Written Opinion, PCT/US2023/084661, Apr. 29, 2024, 7 pgs.

* cited by examiner

DYNAMIC MANAGEMENT OF MEMORY READ REQUESTS

RELATED APPLICATION

This application is a continuation of, and claims benefit of, U.S. patent application Ser. No. 18/092,007, filed Dec. 30, 2022, titled "Dynamic Management of Memory Read Requests," which is incorporated by reference in its entirety.

TECHNICAL FIELD

This application relates generally to memory management including, but not limited to, methods, systems, and non-transitory computer-readable media for managing granularity levels of background system read requests for memory access and improving quality of service associated with memory workloads.

BACKGROUND

Memory is applied in a computer system to store instructions and data, and the data are processed by one or more processors according to the instructions stored in the memory. Multiple memory units are applied in different portions of the computer system to serve different functions. Primary memory (e.g., registers and caches) are used within the one or more processors to support calculations and operations on data in real time. The one or more processors are coupled via a memory bus to main memory that often includes random access memory (RAM). The main memory provides instructions and data to the one or more processors if the instructions and data cannot be found in the primary memory. Both the primary and main memory are volatile memory that needs to be regularly refreshed and loses data stored thereon if decoupled from a power source. Additionally, the one or more processors are further coupled to secondary memory (e.g., hard disk drives (HDDs) or solid-state drives (SSDs)), which is non-volatile memory that keeps data stored thereon if decoupled from a power source.

The secondary storage receives not only host write and read requests from the one or more processors of the computer system, but also system write and read requests from a memory controller to manage the secondary storage itself. A system read request oftentimes involves a memory block that is relatively large in size, causing a large latency time for any host write or read request that follows the system read request. It would be beneficial to manage memory read and write requests in a memory access queue to balance system and host memory access requests, such that the memory of the computer device can be accessed efficiently in response to host access requests.

SUMMARY

Various embodiments of this application are directed to methods, systems, devices, non-transitory computer-readable media for managing workloads of a memory device (e.g., SSDs, HDDs). Host read requests and system read requests are queued in a memory workload and prioritized based on a workload condition of a memory workload. Specifically, system read requests (also called background read requests or non-host read requests) are dispatched by a memory controller to implement internal memory management functions including, but are not limited to, garbage collection, read disturb, memory snapshot capturing, memory mirroring, caching, and memory sparing. In some embodiments, a host read request that follows a system read request is moved ahead of the system read request entirely. Alternatively, in some embodiments, a system read request is managed with different granularity levels. A system read operation corresponding to a system read request is divided into a plurality of system read operations for smaller memory chunks, and a host read request that follows the system read request is moved ahead of, and implemented before, a subset of the plurality of system read operations. By these means, a latency time of the host read request is shortened, and quality of service (QOS) of the memory workload is improved in view of a priority granted to the host read request.

In one aspect, a method is implemented at an electronic device to control access to a memory system of the electronic device. The method includes identifying a queue of memory access requests to access the memory system. The queue of memory access requests includes at least one host read request and a current system read request. The method further includes monitoring a workload condition of the memory system based on the queue of memory access requests and generating at least a first system read request and a second system read request from the current system read request based on the workload condition of the memory system. The method further includes updating the queue of memory access requests by inserting the at least one host read request after the first system read request and before the second system read request.

In some embodiments, the method further includes determining a system read chunk size based on the workload condition of the memory system. The first and second system read requests are generated from the current system read request based on the system read chunk size. Further, in some embodiments, determining the system read chunk size based on the workload condition of the memory system further includes in accordance with a determination that more than a threshold portion (e.g., >50%) of the queue of memory access requests are read requests, selecting a first system read chunk size and in accordance with a determination that the threshold portion or less than the threshold portion (e.g., ≤50%) of the queue of memory access requests are read requests, selecting a second system read chunk size. The first system read chunk size is smaller than the second system read chunk size.

In some embodiments, the method further includes determining a host read forwarding limit based on the workload condition of the memory system. Further, in some embodiments, determining the host read forwarding limit based on the workload condition of the memory system further includes in accordance with a determination that more than a threshold portion (e.g., >50%) of the queue of memory access requests are read requests, selecting a first host read forwarding limit and in accordance with a determination that the threshold portion or less than the threshold portion (e.g., ≤50%) of the queue of memory access requests are read requests, selecting a second host read forwarding limit. The first host read forwarding limit is greater than (i.e., more aggressive than) the second host read forwarding limit.

In another aspect, some implementations include an electronic device that includes one or more processors and memory having instructions stored thereon, which when executed by the one or more processors cause the processors to perform any of the above methods to control access to a memory system of the electronic device.

In yet another aspect, some implementations include a non-transitory computer readable storage medium storing one or more programs. The one or more programs include instructions, which when executed by one or more processors cause the processors to implement any of the above methods to control access to a memory system of an electronic device.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
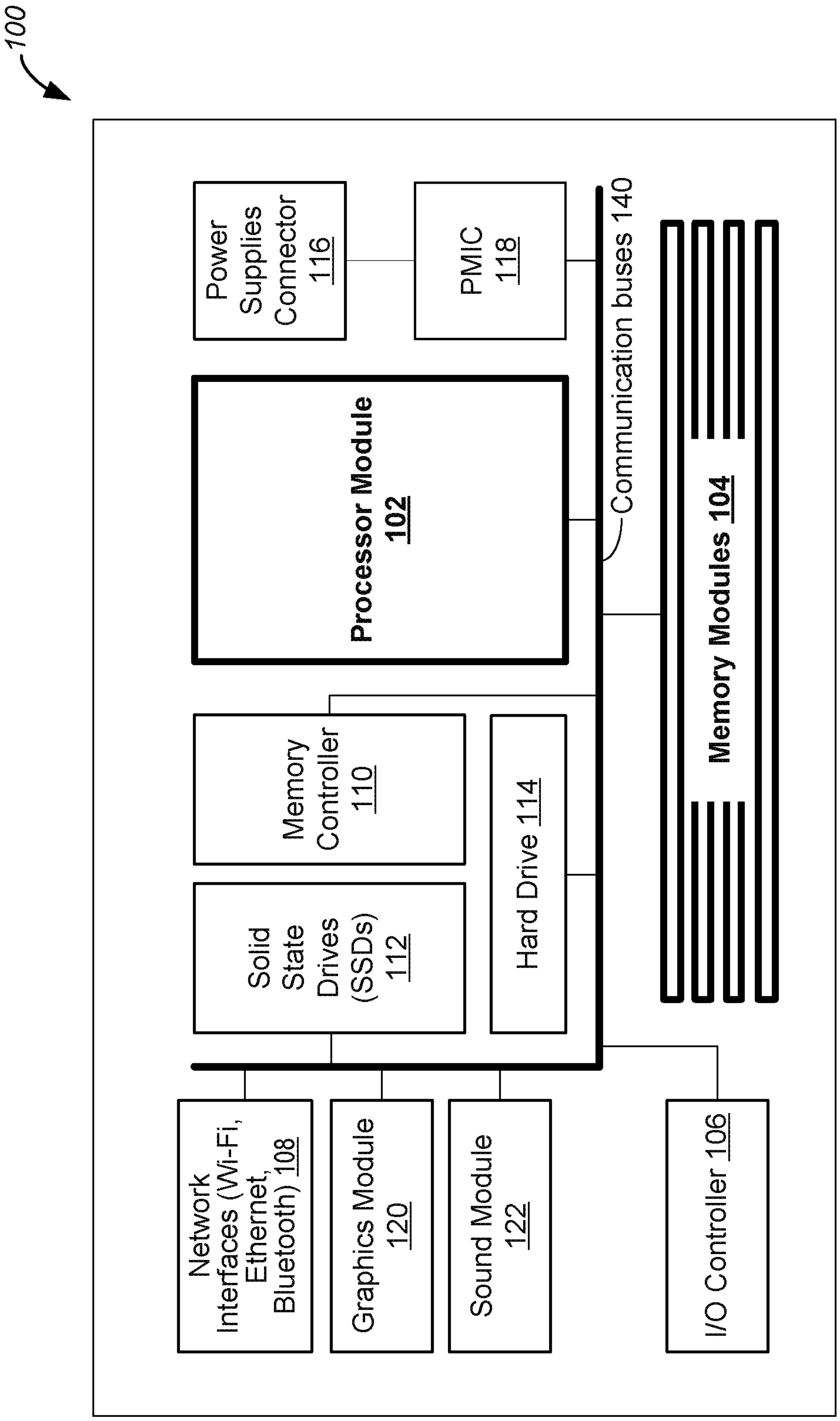
Figure 1 (Prior art)
FIG. 1 is a block diagram of an example system module in a typical electronic device in accordance with some embodiments.

FIG. 1 is a block diagram of an example system module 100 in a typical electronic device in accordance with some embodiments. The system module 100 in this electronic device includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a track-pad) via a universal serial bus interface. In some embodiments, the network interfaces 108 includes one or more interfaces for Wi-Fi, Ethernet and Bluetooth networks, each allowing the electronic device to exchange data with an external source, e.g., a server or another electronic device. In some embodiments, the communication buses 150 include circuitry (sometimes called a chipset) that interconnects and controls communications among various system components included in system module 100.

In some embodiments, the memory modules 104 include high-speed random access memory, such as DRAM, SRAM, DDR RAM, or other random access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, solid state drives (SSDs) 112, a hard disk drive (HDD) 114, power management integrated circuit (PMIC) 118, a graphics module 120, and a sound module 122. The memory controller 110 is configured to control communication between the processor module 102 and memory components, including the memory modules 104, in electronic device. The SSDs 112 are configured to apply integrated circuit assemblies to store data in the electronic device, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic device. The graphics module 120 is configured to generate a feed of output images to one or more display devices according to their desirable image/video formats. The sound module 122 is configured to facilitate the input and output of audio signals to and from the electronic device under control of computer programs.

It is noted that communication buses 150 also interconnect and control communications among various system components including components 110-122.

Further, one skilled in the art knows that other non-transitory computer readable storage media can be used, as new data storage technologies are developed for storing information in the non-transitory computer readable storage media in the memory modules 104 and in SSDs 112. These new non-transitory computer readable storage media include, but are not limited to, those manufactured from biological materials, nanowires, carbon nanotubes and individual molecules, even though the respective data storage technologies are currently under development and yet to be commercialized.

Some implementations of this application are directed to managing workloads of a memory system (e.g., SSDs 112 of the system module 100 in FIG. 1) by controlling granularity levels of background system read requests in host read workloads or mixed host workloads of the memory system. System read requests (also called background read requests or non-host read requests) are dispatched by a memory controller to implement internal memory management functions including, but are not limited to, garbage collection, read disturb, memory snapshot capturing, memory mirroring, caching, and memory sparing. The system read requests are queued jointly with host read requests in memory workloads. In some embodiments, a host read request is moved ahead of a system read request entirely. Alternatively, in some embodiments, a system read operation corresponding to a system read request is divided into a plurality of system read operations for smaller memory chunks, and a host read request is moved ahead of, and implemented before, a subset (e.g., less than all) of the plurality of system read operations. A latency time of the host read request is shorted by at least an operation time of the subset of the plurality of system read operations. By these means, QoS of the corresponding host read workload or mixed host workload is improved in view of a priority granted to the host read request in such memory workloads.

In some embodiments, a system read request corresponds to a memory block that is substantially large in size (e.g., equal to 64 KB), e.g., for the purposes of performing garbage collection and gaining better performance of random write workloads. Based on a corresponding workload condition, the memory block associated with the system read request is divided into a plurality of memory chunks that are smaller in size (e.g., 4 KB, 16 KB), and a plurality of system read requests are generated to read the plurality of memory chunks from the memory system. For each memory chunk, a corresponding tread and input/output overhead is reduced compared with the memory block associated with the original system read request. A subsequent host read request is forwarded around one or more of the plurality of memory chunks that have not been processed in response to the system read request, rather than waiting for an extended system read operation to be completed for the entire memory block in response to the system read request.

In some situations, a completion time of a host read request is a combination of a host read time for accessing memory cells, a data transfer time, a firmware processing time, and a wait time for one or more system reads that precedes the host read request to be completed. The wait time of the host read request is shorted by moving this host read request forward around system reads of one or more small memory chunks associated with a system read request for a larger memory block. By these means, the total completion time for host read requests is reduced in a memory workload (e.g., a host read workload, a mixed host workload) including the host read request and system read request.

In some embodiments, a host read request is prioritized based on a workload condition of a memory system. Conditions of memory workloads are monitored, e.g., to detect a ratio between a number of read requests and a number of total memory access requests, and applied to determine a system read chunk size and a host read forwarding limit. A system read request is received for accessing a memory block. The memory block corresponding to the system read request is divided to a plurality of memory chunks based on the system read chunk size. A host read request is moved forward in a queue associated with the memory workload, and will be processed before an access to one or more (i.e., less than all) memory chunks corresponding to the system read request. Stated another way, based on the workload condition, the host read request is prioritized by suspending the access to the one or more memory chunks associated with the system read request, thereby reducing the latency time of the host read request.

Figure 2:
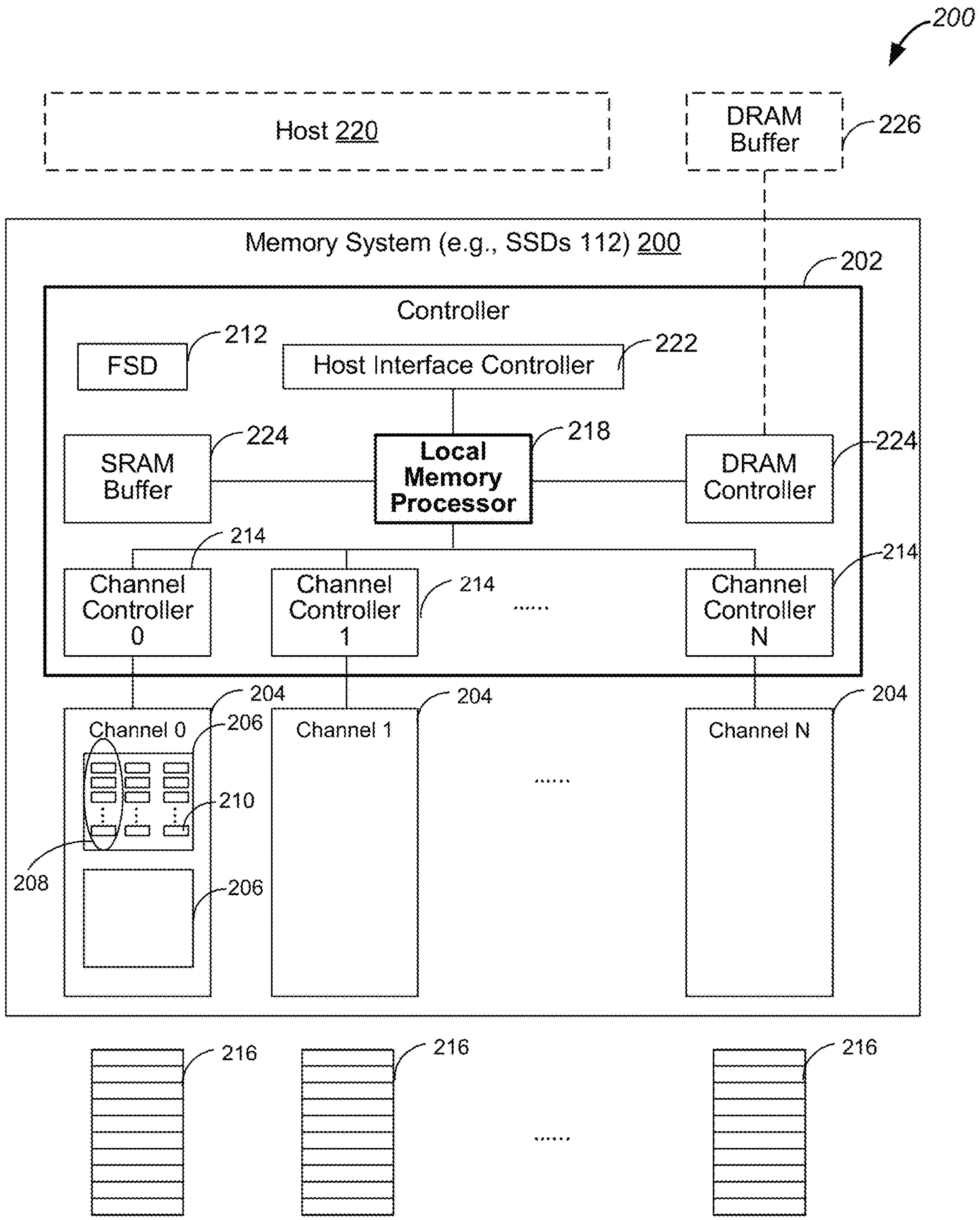
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 further includes a controller 202 and a plurality of memory channels 204. Each memory channels 204 includes a plurality of memory cells. The controller 202 is configured to executes firmware level software to bridge the plurality of memory channels 204 to the host device 220. Specifically, the controller 202 is configured to communicate with the host device 220, manage a file system directory 212 for tracking data locations in the memory channels 204, organize the plurality of memory channels 204, and facilitate internal and external requests to access the memory channels 204.

Each memory channels 204 includes on one or more memory packages 206 (e.g., two memory chips, two memory dies). In an example, each memory package 206 corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory system 200 includes a single-level cell (SLC) SSD, and each memory cell stores a single data bit. In some embodiments, the memory system 200 includes a multi-level cell (MLC) SSD, and each memory cell stores a plurality of data bits. In an example, each memory cell of a triple-level cell (TLC) SSD stores 3 data bits. In another example, each memory cell of a quad-level cell (QLC) SSD stores 4 data bits. In yet another example, each memory cell of a penta-level cell (PLC) SSD stores 5 data bits. In some embodiments, each memory cell can store any suitable number of data bits. Compared with the MLC SSD, the SLC SSD operates with a higher speed, a higher reliability, and a longer lifespan, and however, has a lower device density and a higher price.

Each memory channel 204 is coupled to a respective channel controller 214 configured to control internal and external requests to access memory cells in the respective memory channel 204. In some embodiments, each memory package 206 (e.g., each memory die) corresponds to a respective queue 216 of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory system 200 corresponds to a single queue 216 of memory access requests. Each memory access request is optionally received internally from the memory system 200 to manage the respective memory channel 204 or externally from the host device 220 to write or read data stored in the respective channel 204. Specifically, each memory access request includes one of: a system write request that is received from the memory system 200 to write to the respective memory channel 204, a system read request that is received from the memory system 200 to read from the respective memory channel 204, a host write request that originates from the host device 220 to write to the respective memory channel 204, and a host read request that is received from the host device 220 to read from the respective memory channel 204.

Further, in some embodiments, a queue 216 of memory access requests includes a memory read queue that includes only system read requests, host read requests, or a combination thereof. Alternatively, in some embodiments, a queue 216 of memory access requests includes a mixed memory access queue that includes at least a write request and a read request, while the write request is optionally a system write request or a host write request and the read request is optionally a system read request or a read write request.

A memory workload of the memory system 200 includes the one or more queues 216 of memory access requests. In some embodiments, the memory workload includes a host read workload that starts with host read requests, and does not include any host write requests. The memory workload further incorporates system read requests, system write requests, or both, and the one or more queues 216 include the host read requests and one or more of: a system read request, a system write request, or a combination thereof. Alternatively, in some embodiments, the memory workload includes a host write workload, and incorporates in which the one or more queues 216 include only system write requests that starts with host write requests, and does not include any host read requests. The memory workload further incorporates system read requests, system write requests, or both, and the one or more queues 216 include the host write requests and one or more of: a system read request, a system write request, or a combination thereof. Additionally and alternatively, in some embodiments, the memory workload includes a mixed host workload further having both host read requests and host write requests, and further incorporates system read requests, system write requests, or both. The one or more queues 216 include at least a write request and a read request, while the write request is optionally a system write request or a host write request and the read request is optionally a system read request or a read write request.

It is noted that system read requests (also called background read requests or non-host read requests) and system write requests are dispatched by a memory controller to implement internal memory management functions including, but are not limited to, garbage collection, read disturb, memory snapshot capturing, memory mirroring, caching, and memory sparing.

In some embodiments, in addition to the FSD 212 and channel controllers 214, the controller 202 further includes a local memory processor 218, a host interface controller 222, an SRAM buffer 224, and a DRAM controller 224. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 226 that is main memory used by the processor module 102 (FIG. 1).

Figure 3:
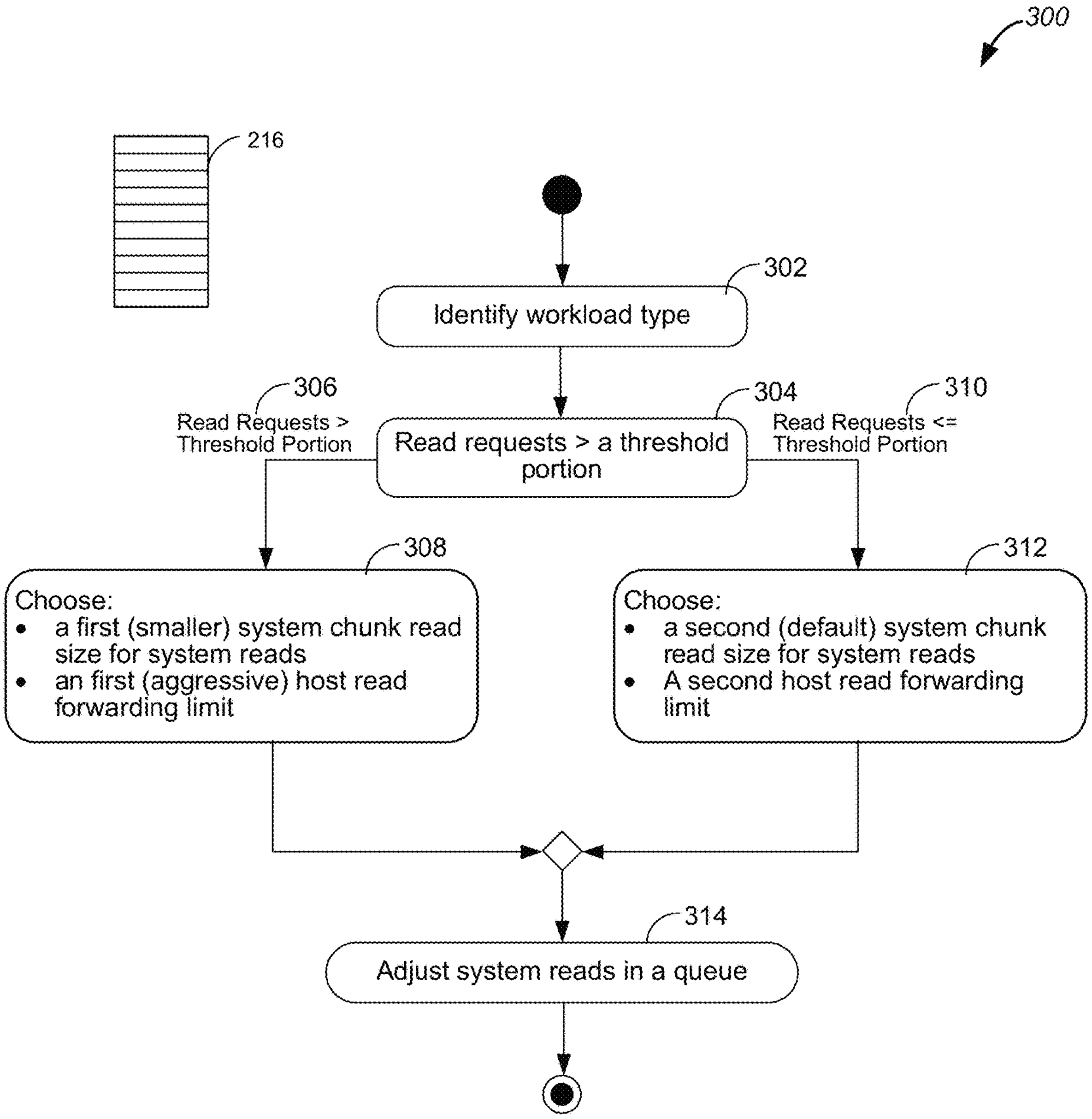
FIG. 3 is a flow diagram of a process of managing system read requests in a memory workload, in accordance with some embodiments.

FIG. 3 is a flow diagram of a process 300 of managing system read requests in a memory workload, in accordance with some embodiments. The memory workload includes one or more queues 216 of memory access requests. Each memory request is one of: a system write request that is received from the memory system 200 to write to the respective memory channel 204, a system read request that is received from the memory system 200 to read from the respective memory channel 204, a host write request that is received from the host device 220 to write to the respective memory channel 204, and a host read request that is received from the host device 220 to read from the respective memory channel 204. Based on types of the memory access requests in the one or more queues 216, the memory workload has a workload type selected from: a host read workload in which the one or more queues 216 include at least host read requests and optionally includes system read requests, system write requests, or a combination thereof; a host write workload in which the one or more queues 216 include at least host write requests and optionally includes system write requests, system read requests, or a combination thereof; and a mixed host workload in which the one or more queues 216 include at least a write request and a read request.

In some embodiments, the process 300 is applied to a mixed host workload including at least a write request and a read request. The controller 202 of the memory system 200 (FIG. 2) identifies (step 302) a workload type of the memory workload including the one or more queues 216 of memory access requests. In accordance with a determination that the memory workload is a mixed host workload, the controller 202 determines that the one or more queues 216 include a total number of memory access requests and a first number of read requests. The first number of read requests is a sum of a number of system read requests and a number of host read requests. The controller 202 further monitors a workload condition of the memory system 200 based on the memory workload including the one or more queues 216 of memory access requests, and determines (step 304) whether a ratio of the read requests in the one or more queues 216 exceeds a predetermined threshold portion (e.g., 40%, 50%, or 75%). In accordance with a determination that the ratio of the read requests is greater (step 306) than the predetermined threshold portion, the controller 202 selects (step 308) a first system read chunk size (e.g., 16 KB) and a first host read forwarding limit (e.g., a first multiple of the first system read chunk size). In some embodiments, while the memory load is monitored, the controller 202 compares the ration of the read requests with the predetermined threshold portion according to a skip check frequency check (e.g., every 100 milliseconds).

Conversely, in accordance with a determination that the ratio of the read requests is not greater (step 310) than the predetermined threshold portion (i.e., equal to or less than the predetermined threshold portion), the controller 202 selects (step 312) a second system read chunk size (e.g., 64 KB) and a second host read forwarding limit (e.g., a second multiple of the first system read chunk size). In some embodiments, the second system read chunk size and second host read forwarding limit are default settings applied by the controller 202 to manage the system read requests. The first system read chunk size is smaller than the second system read chunk size, and the first host read forwarding limit is greater than the second host read forwarding limit (i.e., the first multiple is greater than the second multiple). Stated another way, when the controller 202 is processing a mixed host workload having excessive read requests (e.g., greater than the threshold portion), the controller 202 increases a granularity level and a total memory read size that can be held from system read operations to allow a host read request to be moved forward around. By these means, the host read request is prioritized to avoid an extended wait time for the host read request, and the associated system read operations are dynamically adjusted (314) in the one or more queues 216 based on a priority level of the host read request.

In some embodiments, the controller 202 selects (step 308) the first system read chunk size and first host read forwarding limit in accordance with a determination that the ratio of the read requests is greater than or equal to (step 306) the predetermined threshold portion. The controller 202 selects (step 312) the second system read chunk size and second host read forwarding limit in accordance with a determination that the ratio of the read requests is less than (step 310) the predetermined threshold portion.

It is noted that in some embodiments, the process 300 includes workload detection (step 302) to ensure that solution is enabled only for one or more predefined workload types (e.g., a mixed host workload, a host read workload). Based on the ratio of the read requests in the one or more queues 216 (i.e., the load condition of the memory system 200), the controller 202 determines the granularity level and the total memory read size that can be held from system read operations to allow a host read request to be moved forward around. Specifically, memory blocks corresponding to the system read requests are broken into smaller read chunks based on the granularity level. Compared with an unbroken memory block, each memory read chunk has a smaller block size (i.e., corresponding to memory chunks) and a smaller data transfer time $t_{io}$. The firmware prioritizes the host read requests over system read requests corresponding to the smaller read chunks, allowing the host read request to move forward around memory read chunks of a memory block corresponding to a system read request and get a smaller latency time. Additionally, the first or second host read forwarding limit is applied to control a priority level granted to the host read requests and avoid starvation (i.e., excessive delays) of system read requests. As such, both the system read chunk size and host read forwarding limit are dynamically selected based on the workload condition (e.g., the ratio of the read requests) of the memory workload.

A system read request for a certain memory block is broken into system read requests for a plurality of smaller memory chunks. One or more of system read requests for the smaller memory chunks are postponed to allow a subsequent host read request or a subsequent write request to be implemented in advance. In some situation, this reduces an efficiency for garbage collection or any other system read based functions associated with the system read request, which affects performance of subsequent random write operations negatively in this mixed host workload. As such, the process 300 is implemented dynamically to control a priority level granted to a host read request based on the workload condition (e.g., the ratio of the read requests) of the memory workload.

In some embodiments, the process 300 is applied to a host read workload including at least host read requests. The corresponding queues 216 optionally includes system read requests, system write requests, or a combination thereof. The controller 202 of the memory system 200 (FIG. 2) identifies (step 302) the workload type of the memory workload as the host read workload. In accordance with a determination that the memory workload is a host read workload, the controller 202 determines that the one or more queues 216 include a total number of memory access requests and a first number of system and host read requests. The controller 202 further determines (step 304) whether a ratio of the system and host read requests in the one or more queues 216 exceeds a predetermined threshold portion (e.g., 40%, 50%, or 75%). In accordance with a determination that the ratio of the read requests is greater (step 306) than the predetermined threshold portion, the controller 202 selects (step 308) a first system read chunk size (e.g., 16 KB) and a first host read forwarding limit (e.g., a first multiple of the first system read chunk size). Conversely, in accordance with a determination that the ratio of the read requests is not greater (step 310) than the predetermined threshold portion (i.e., equal to or less than the predetermined threshold portion), the controller 202 selects (step 308) a second system read chunk size (e.g., 64 KB) and a second host read forwarding limit (e.g., a second multiple of the first system read chunk size). Stated another way, when the controller 202 is processing a host read workload having excessive system read requests (e.g., greater than the threshold portion), the controller 202 prioritizes the host read requests by increasing a granularity level and a total memory read size that can be held from system read operations to allow a host read request to be moved forward around.

Figure 4A:
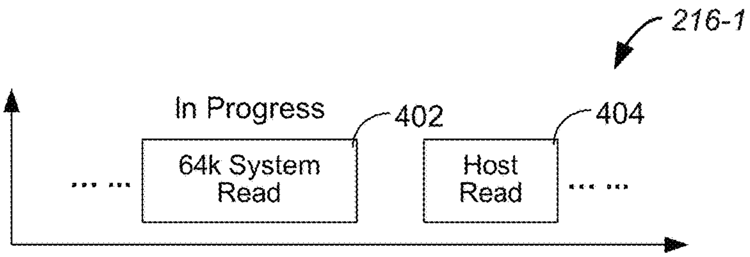
FIG. 4A is a diagram of an example memory access queue including a current system read request followed by at least one host read request, in accordance with some embodiments.
Figure 4B:
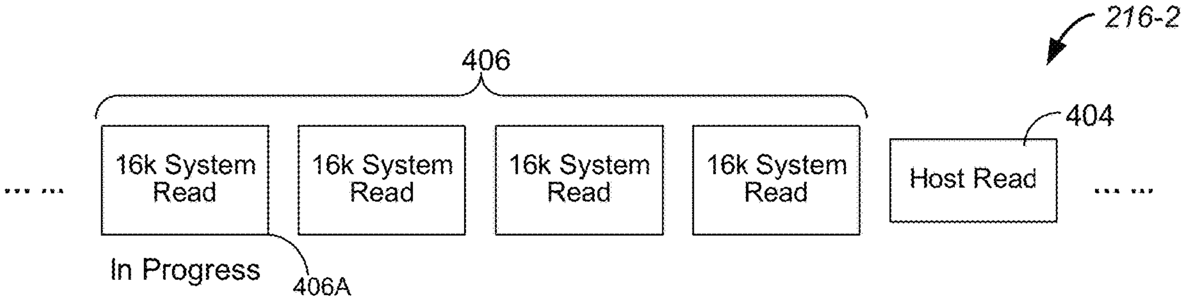
FIG. 4B is a diagram of an example memory access queue including system read requests for memory chunks followed by a host read request, in accordance with some embodiments.
Figure 4C:
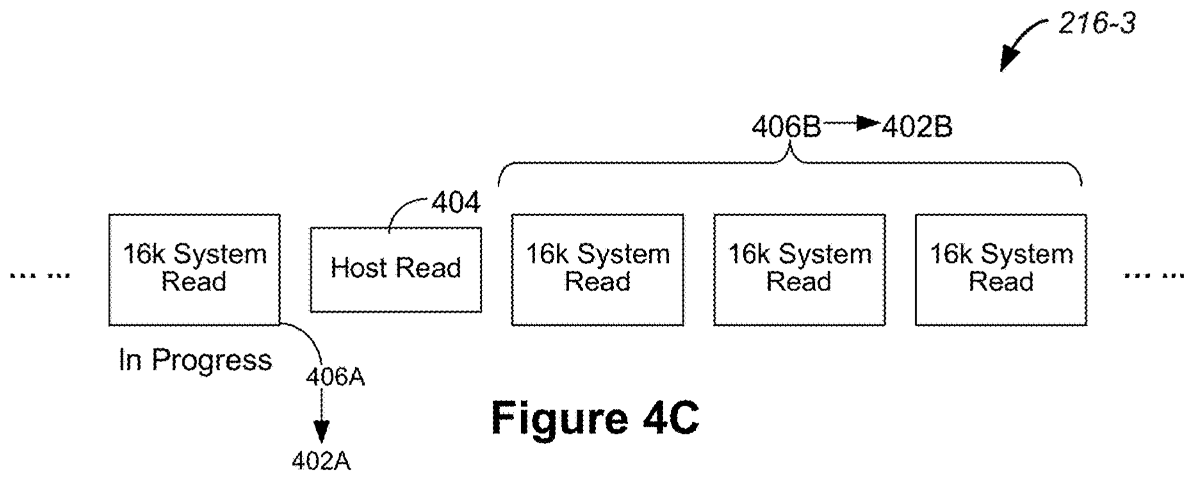
FIGS. 4C-4E are three diagrams of three example memory access queues in which a host read request is moved forward around at least a subset of memory chunks, in accordance with some embodiments.
Figure 4D:
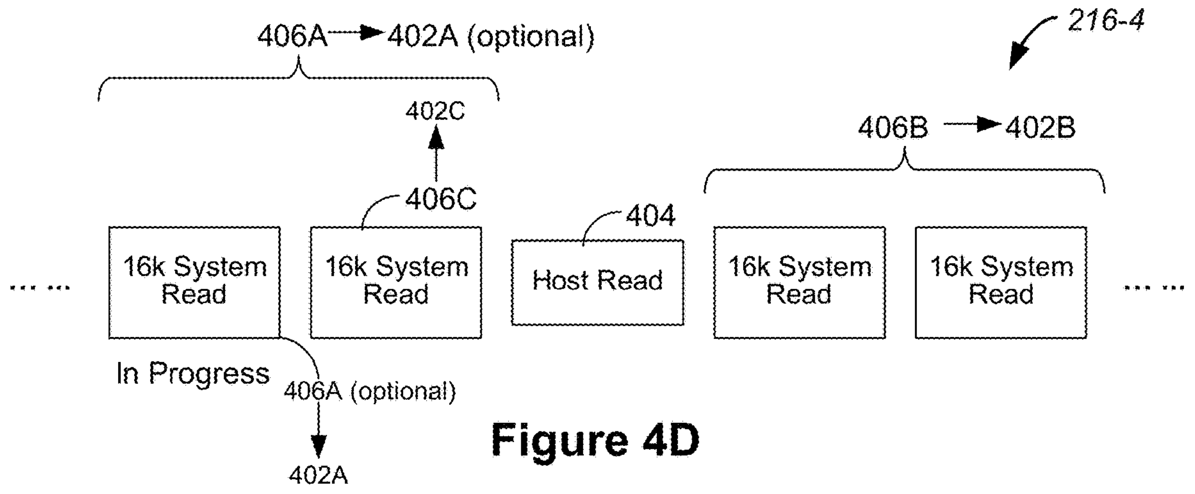
Figure 4E:
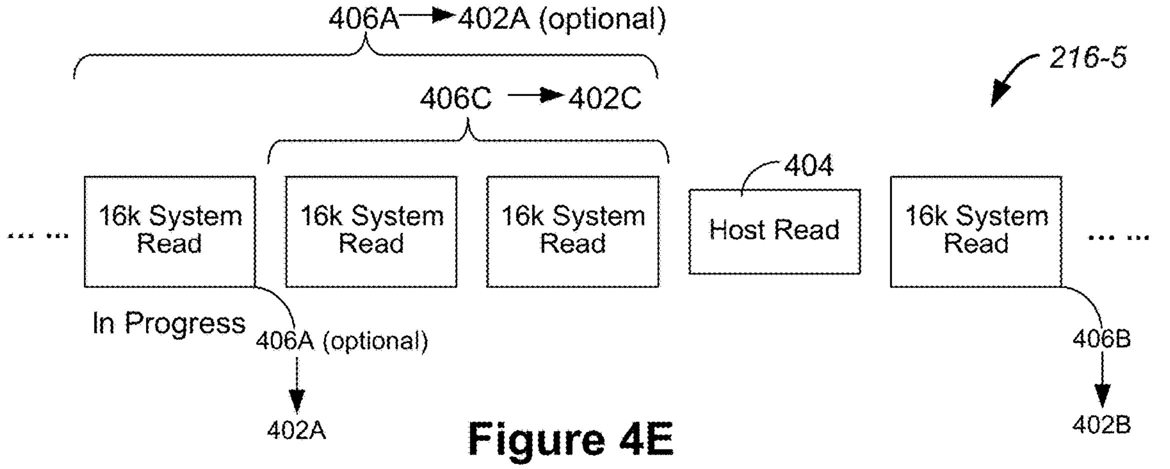

FIG. 4A is a diagram of an example memory access queue 216-1 including a current system read request 402 followed by at least one host read request 404, in accordance with some embodiments. FIG. 4B is a diagram of an example memory access queue 216-2 including a plurality of system read requests for a plurality of memory chunks 406 followed by a host read request 404, in accordance with some embodiments. FIGS. 4C-4E are three diagrams of three example memory access queues 216-3, 216-4, and 216-5 in which a host read request 404 is moved forward around at least a second subset of memory chunks 406B, in accordance with some embodiments. A controller 202 identifies the queue 216-1 of memory access requests to access a memory system 200, and the queue 216-1 of memory access requests includes the at least one host read request 404 and the current system read request 402. In some embodiments, the current system read request 402 has been started to be, and is currently being, processed. For example, the current system read request 402 corresponds to four memory chunks, and each of a first subset of memory chunks 406A (e.g., a single first memory chunk, two first memory chunks) has been processed or is being processed.

The controller 202 monitors a workload condition of the memory system 200 based on the queue 216-1 of memory access requests. In some embodiments, the controller 202 determines a system read chunk size based on the workload condition of the memory system 200. Referring to FIG. 4B, a memory block corresponding to the current system read request 402 is divided into the plurality of memory chunks 406 based on the system read chunk size. Each system read chunk 406 has a chunk size equal to the system read chunk size. For example, the system read chunk size is determined to be 16 KB based on the workload condition of the memory system 200. The memory block has a total memory read size of 64 KB and corresponds to four memory chunks 406 each of which has a chunk size of 16 KB.

The controller 202 generates at least a first system read request 402A corresponding to a first subset of memory chunks 406A and a second system read request 402B corresponding to a second subset of memory chunks 406B from the current system read request 402 based on the workload condition of the memory system. The queue 216-1 of memory access requests is updated by inserting the at least one host read request 404 after the first system read request 402A and before the second system read request 402B. In some embodiments, the controller 202 determines that each of the first subset of memory chunks 406A has been processed or is being processed in response to the current system read request 402, and therefore, associates the first subset of memory chunks 406A with the first system read request 402A, which is already too late to be held and postponed. In an example, the first subset of memory chunks 406A corresponding to the first system read request 402A includes a single memory chunk 406A. In another example not shown, the subset of memory chunks 406A corresponding to the first system read request 402A includes two or more memory chunks.

Referring to FIG. 4C, in some embodiments, the second subset of memory chunks 406B includes three remaining memory chunks of the plurality of memory chunks corresponding to the current system read request 402. The first subset of memory chunks 406A and the second subset of memory chunks 406B form an entirety of the memory block 406 corresponding to the current system read request 402. The host read request 404 is moved forward around the second system read request 402B until the host read request 404 hits the first system read request 402A, which is being processed and cannot be held or postponed to prioritize the host read request 404.

Referring to FIG. 4D, in some embodiments, the second subset of memory chunks 406B includes two of the three remaining memory chunks corresponding to the current system read request 402. The first subset of memory chunks 406A and the second subset of memory chunks 406B do not form an entirety of the memory block 406 corresponding to the current system read request 402. The host read request 404 is moved forward around the second system read request 402B corresponding to the second subset of memory chunks 406B, but not moved forward further by a third subset of memory chunks 406C (e.g., including a single memory chunk), which are not processed yet in response to the current system request. Referring to FIG. 4E, in some embodiments, the second subset of memory chunks 406B includes a last memory chunk corresponding to the current system read request 402. The first subset of memory chunks 406A and the second subset of memory chunks 406B do not form an entirety of the memory block 406 corresponding to the current system read request 402. The host read request 404 is moved forward around the second system read request 402B corresponding to the second subset of memory chunks 406B, but not moved forward further by a third subset of memory chunks 406C (e.g., including two middle memory chunks), which are not processed yet in response to the current system read request 402.

In some embodiments, a third system read request 402C is generated for the third subset of memory chunks 406C. The host read request 404 is inserted after the third system read request 402C and before the second system read request 402B. Alternatively, in some embodiments, the first system read request 402 is generated to include the third subset of memory chunks 406C in addition to the first subset of memory chunks 406A. The host read request 404 is inserted between the first and second system read request 402A and 402B.

Referring to FIGS. 4D and 4E, in some embodiments, after being moved forward around the second subset of memory chunks 406B, the host read request 404 reaches a host read forwarding limit, and therefore, cannot be moved forward further around the third subset of memory chunks 406C (e.g., including two middle memory chunks), which are not processed yet in response to the current system read request 402. The host read forwarding limit is determined based on the workload condition of the memory system 200. In some embodiments, the workload condition of the memory system 200 is monitored based on the queue 216-1 of memory access requests. In accordance with a determination that more than a threshold portion (e.g., >50%) of the queue 216-1 of memory access requests are read requests (e.g., system read requests or host read requests), the controller selects a first host read forwarding limit (e.g., 48 KB, 3 access requests). The first read forwarding limit is optionally measured by one of a size of memory data that is accessed, a number of memory access requests, and a time of memory access operations. Conversely, in accordance with a determination that the threshold portion or less than the threshold portion (e.g., ≤50%) of the queue 216-1 of memory access requests are read requests, the controller 202 selects a second host read forwarding limit. The first host read forwarding limit is greater than the second host read forwarding limit. Stated another way, as the queue 216-1 has a relatively large number of read requests, the controller 202 is configured to grant a higher priority level to the host read request 404 by allowing the host read request 404 to be moved forward around a larger memory read size.

Figure 5A:
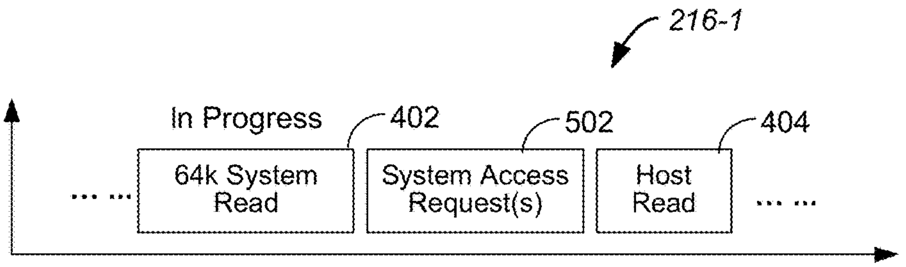
FIG. 5A is a diagram of an example memory access queue including a current system read request followed by additional system access requests and at least one host read request, in accordance with some embodiments.
Figure 5B:
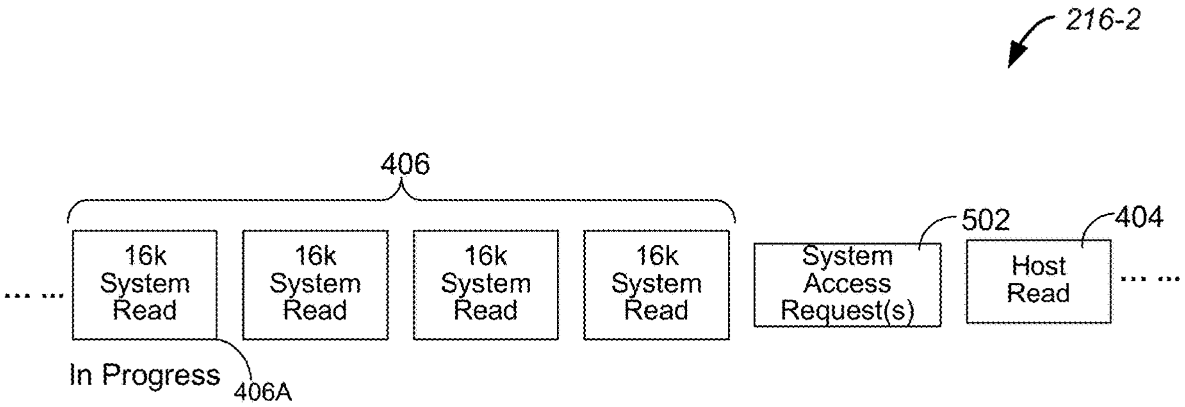
FIG. 5B is a diagram of an example memory access queue including system read requests for memory chunks followed by additional system access requests and a host read request, in accordance with some embodiments.
Figure 5C:
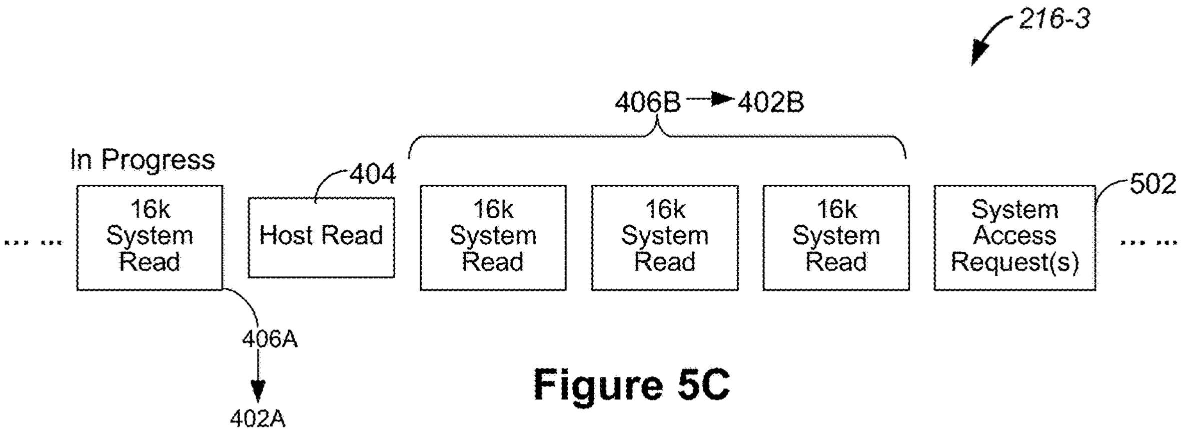
FIGS. 5C-5E are three diagrams of three example memory access queues in which a host read request is moved forward around at least a subset of memory chunks and additional system access requests, in accordance with some embodiments.
Figure 5D:
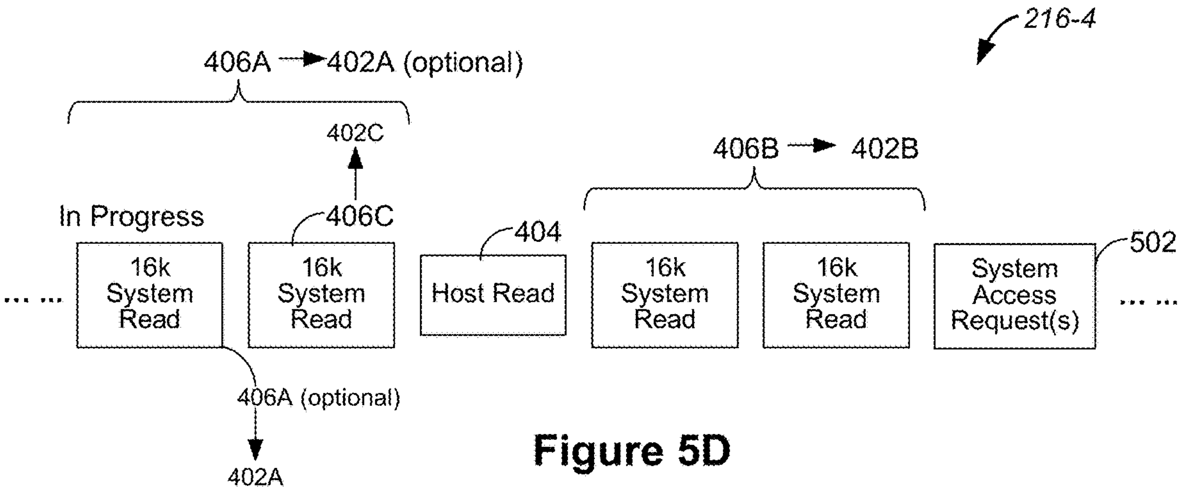
Figure 5E:
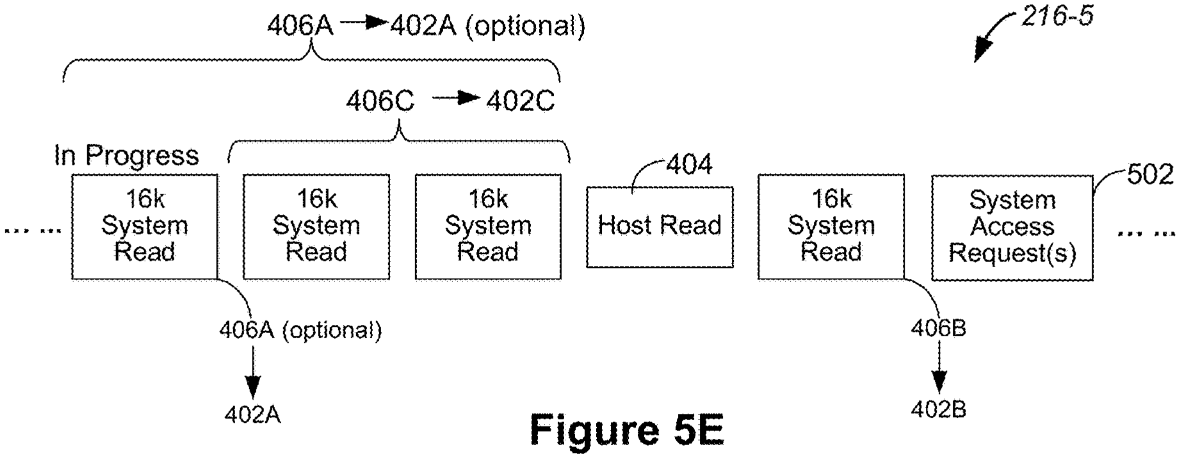

FIG. 5A is a diagram of an example memory access queue 216-1 including a current system read request 402 followed by one or more additional system access requests 502 and at least one host read request 404, in accordance with some embodiments. FIG. 5B is a diagram of an example memory access queue 216-2 including a plurality of system read requests for a plurality of memory chunks 406 followed by one or more additional system access requests 502 and a host read request 404, in accordance with some embodiments. FIGS. 5C-5E are three diagrams of three example memory access queues 216-3, 216-4, and 216-5 in which a host read request 404 is moved forward around at least a second subset of memory chunks 406B and one or more additional system access requests 502, in accordance with some embodiments. As explained above, in some embodiments (FIGS. 4A-4E), the system read request 402 is immediately followed by the host read request 404. Conversely, referring FIGS. 5A-5E, in some embodiments, the system read request 402 is not immediately followed by the host read request 404. Instead, the system read request 402 is immediately followed by one or more additional system access requests 502, which are further immediately followed by the host read request 404. In some embodiments, the host read request 404 is not moved forward around a host write request to avoid read errors.

The host read request 404 is moved forward in the queue 216-2 around both the one or more additional system access requests 502 and the second system read request 402B. Each of the one or more additional system access requests 502 has not been processed by the controller 202 yet, and the second system read request 402B correspond to a second subset of memory chunk 406B that has not been processed by the controller 202 in response to the current system read request 402. As such, the queue 216-1 of memory access requests is updated to the queue 216-3, 216-4, or 216-5 in which the host read request 404 is moved forward in the queue 216-2 around the one or more additional system access requests 502 and the second system read request 402B.

The controller 202 monitors a workload condition of the memory system 200 based on the queue 216-1 of memory access requests. In some embodiments, the controller 202 determines a system read chunk size and a host read forwarding limit based on the workload condition of the memory system 200. In some embodiments, in accordance with a determination that more than a threshold portion (e.g., >50%) of the queue 216-1 of memory access requests are read requests, the controller 202 selects a first system read chunk size (e.g., 16 KB) and a first host read forwarding limit (e.g., 16 KB×32). Conversely, in accordance with a determination that the threshold portion or less than the threshold portion (e.g., ≤50%) of the queue 216-1 of memory access requests are read requests, the controller 202 selects a second system read chunk size (e.g., 64 KB) and a second host read forwarding limit (e.g., 64 KB×2). The first system read chunk size is smaller than, and corresponds to a higher granularity level than, the second system read chunk size. The first host read forwarding limit is greater than the second host read forwarding limit, thereby allowing a more aggressive operation of moving the host read request 404 forward.

In some embodiments, the current system read request 402 is implemented based on a memory block having a size that is equal to the second system read chunk size. The memory block corresponding to the current system read request 402 has the same granularity level as the second system read chunk size. Stated another way, when the threshold portion or less than the threshold portion (e.g., ≤50%) of the queue 216-1 of memory access requests are read requests, the current system read request 402 is not split into two or more system read requests, and the memory block corresponding to the current system read request 402 is not divided into a plurality of subsets of memory chunks smaller than the memory block. The memory block corresponding to the current system read request 402 is optionally bypassed by, or processed before, the host read request 404 as a whole.

Referring to FIG. 5C, in some embodiments, a first subset of memory chunks 406A is being processed, and the host read request 404 cannot be moved forward around. A second subset of memory chunks 406B includes three remaining memory chunks of a plurality of memory chunks corresponding to the current system read request 402. The first subset of memory chunks 406A and the second subset of memory chunks 406B form an entirety of the memory block 406 corresponding to the current system read request 402. The host read request 404 is moved forward around both the one or more system access requests 502 and the second system read request 402B until the host read request 404 hits the first system read request 402A, which is being processed and cannot be held or postponed to prioritize the host read request 404. A total memory size of the one or more system access requests 502 and the second system read request 402B is optionally equal to or less than the host read forwarding limit (e.g., the first host read forwarding limit).

Referring to FIG. 5D, in some embodiments, the second subset of memory chunks 406B includes two of the three remaining memory chunks corresponding to the current system read request 402. The host read request 404 is moved forward around both the one or more system access requests 502 and the second system read request 402B corresponding to the second subset of memory chunks 406B. The host read request 404 is not moved forward further around a third subset of memory chunks 406C (e.g., including a single memory chunk), which are not processed yet in response to the current system request. Referring to FIG. 5E, in some embodiments, the second subset of memory chunks 406B includes a last memory chunk corresponding to the current system read request 402. The host read request 404 is moved forward around both the one or more system access requests 502 and the second system read request 402B corresponding to the second subset of memory chunks 406B. The host read request 404 is not moved forward further around a third subset of memory chunks 406C (e.g., including two middle memory chunks), which are not processed yet in response to the current system read request 402. Referring to FIGS. 5D and 5E, after being moved forward around the one or more system access requests 502 and the second subset of memory chunks 406B, the host read request 404 reaches the host read forwarding limit, and therefore, cannot be moved forward further by the third subset of memory chunks 406C (e.g., including two middle memory chunks), which are not processed yet in response to the current system read request 402.

Figure 6A:
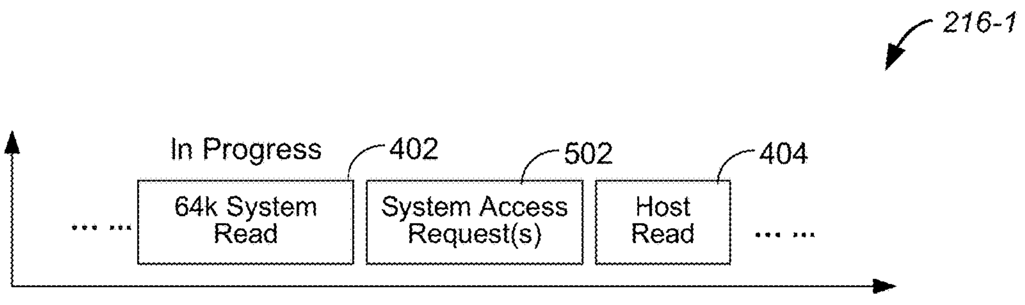
FIG. 6A is a diagram of another example memory access queue including a system read request followed by system access requests and a host read request, in accordance with some embodiments.
Figure 6B:
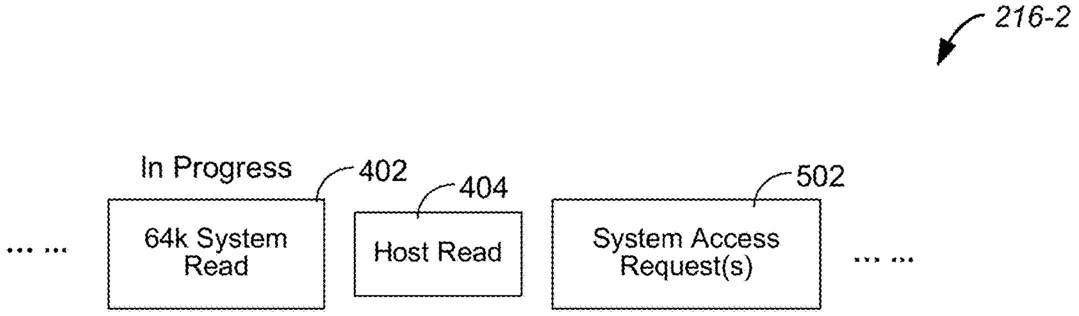
FIGS. 6B and 6C are two diagrams of two example memory access queues in which a host read request is moved forward around system access requests, in accordance with some embodiments.
Figure 6C:
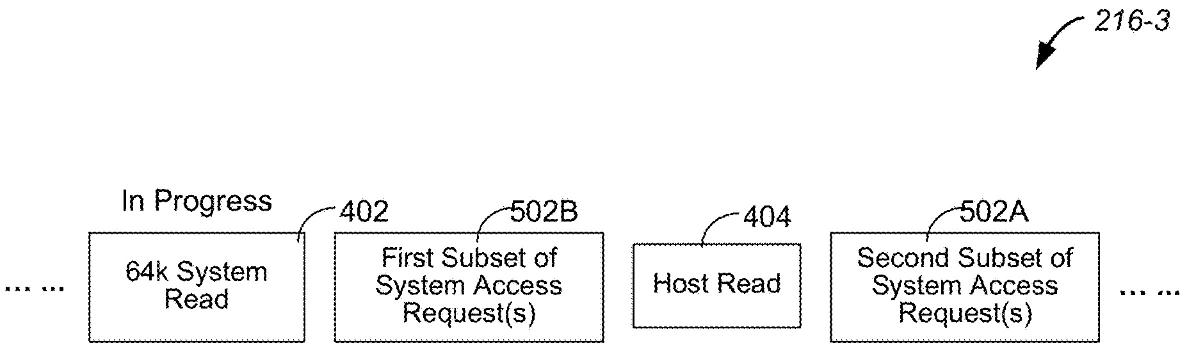

FIG. 6A is a diagram of another example memory access queue 216-1 including a system read request 402 followed by one or more system access requests 502 and a host read request 404, in accordance with some embodiments. FIGS. 6B and 6C are two diagrams of two example memory access queues 216-2 and 216-3 in which a host read request 404 is moved forward around one or more system access requests 502, in accordance with some embodiments. The system read request 402 is immediately followed by one or more additional system access requests 502, which are further immediately followed by the host read request 404

As previously explained, in some situations, a workload condition of a memory system 200 indicates that a threshold portion or less than the threshold portion (e.g., ≤50%) of the queue 216-1 of memory access requests are read requests. The controller 202 selects a second system read chunk size (e.g., 64 KB) and a second host read forwarding limit (e.g., 64 KB×2), which are different from those selected when more than the threshold portion of the queue 216-1 are read requests. In some embodiments, the second system read chunk size and second host read forwarding limit correspond to default settings of the memory system 200. In some embodiments, the current system read request 402 is configured to be implemented based on a memory block, and the memory block has a size that is equal to the selected system read chunk size (e.g., 64 KB). The memory block corresponding to the current system read request 402 has the same granularity level as the second system read chunk size. The current system read request 402 is not split into two or more system read requests (e.g. 402A-402C in FIGS. 4C-4E), and the memory block corresponding to the current system read request 402 is not divided into a plurality of subsets of memory chunks (e.g., 406A-406C in FIGS. 4C-4E) smaller than the memory block. The memory block corresponding to the current system read request 402 is optionally bypassed by, or processed before, the host read request 404 as a whole.

Referring to FIG. 6B, in some embodiments, the system read request 402 is being processed to access the corresponding memory block, and the host read request 404 cannot be moved forward around the system read request 402. The memory block has a size that is equal to the selected system read chunk size, and cannot be divided into smaller memory chunks. The host read request 404 is moved forward around the one or more system access requests 502 until the host read request 404 hits the system read request 402, which is being processed and cannot be held or postponed to prioritize the host read request 404. A total memory size of the one or more system access requests 502 is optionally equal to or less than the selected host read forwarding limit (e.g., the second host read forwarding limit). The queue 206-1 of memory access requests are updated to insert the host read request 404 after the system read request and before the one or more system access requests 502, thereby forming a queue 206-2 of memory access requests in FIG. 6B.

Referring to FIG. 6C, in some embodiments, the host read request 404 is moved forward around a first subset of system access requests 502A. The host read request 404 is not moved forward further around a second subset of system access requests 502B, which are not processed yet. After being moved forward around the first subset of system access requests 502A, the host read request 404 reaches the selected host read forwarding limit, and therefore, cannot be moved forward further by the second subset of system access requests 502B, which have not started to be processed yet.

Under some circumstances, the host read request 404 has a memory read size that is relatively large (e.g., 256 KB) compared with a size of a memory block corresponding to the system read request 402 (e.g., 64 KB) or a selected system read chunk size (e.g., 16 KB) of the system read request, and therefore, is not moved around as a whole. The controller 202 determines that the host read request 404 has a memory read size and compares the memory read size with a predetermined host read size (e.g., 64 KB). The host read request 404 is inserted after the first system read request 402A (FIGS. 4C-4E) and before the second system read request 402B (FIGS. 4C-4E), in accordance with a determination that the memory read size of the host read request 404 is less than the predetermined host read size.

Conversely, in some embodiments, in accordance with a determination that the memory read size of the host read request 404 is equal to or greater than the predetermined host read size, the host read request 404 is divided to a set of successive host read requests, and each successive host read request corresponds to a memory read size that is equal to or less than the predetermined host read size. A first successive host read request is inserted after the first system read request 402A (FIGS. 4C-4E) and before the second system read request 402B (FIGS. 4C-4E). Each of one or more remaining host read request is optionally moved forward based on a host read forwarding limit and whether each system read request 402A, 402B, or 402C is being processed.

In some embodiments, the predetermined host read size is substantially less than or comparable with a size of the memory block corresponding to the system read request 404 (e.g., 64 KB) or a selected system read chunk size (e.g., 16 KB) of the system read request 404. That said, the memory system 200 includes a plurality of memory chunks corresponding to the current system read request 402. The controller 202 determines whether each of the plurality of memory chunks 406 has been processed, is currently being processed, or will be processed and identifies the second subset of memory chunks 406B to be moved forward around by the host read request 404. Each memory chunk 406 has a selected system read chunk size, and the predetermined host read size is less than or substantially equal to the system read chunk size. As a result, a latency time of the system read request 402 caused by moving forward the host read request 404 is controlled at a reasonable level.

Figure 7A:
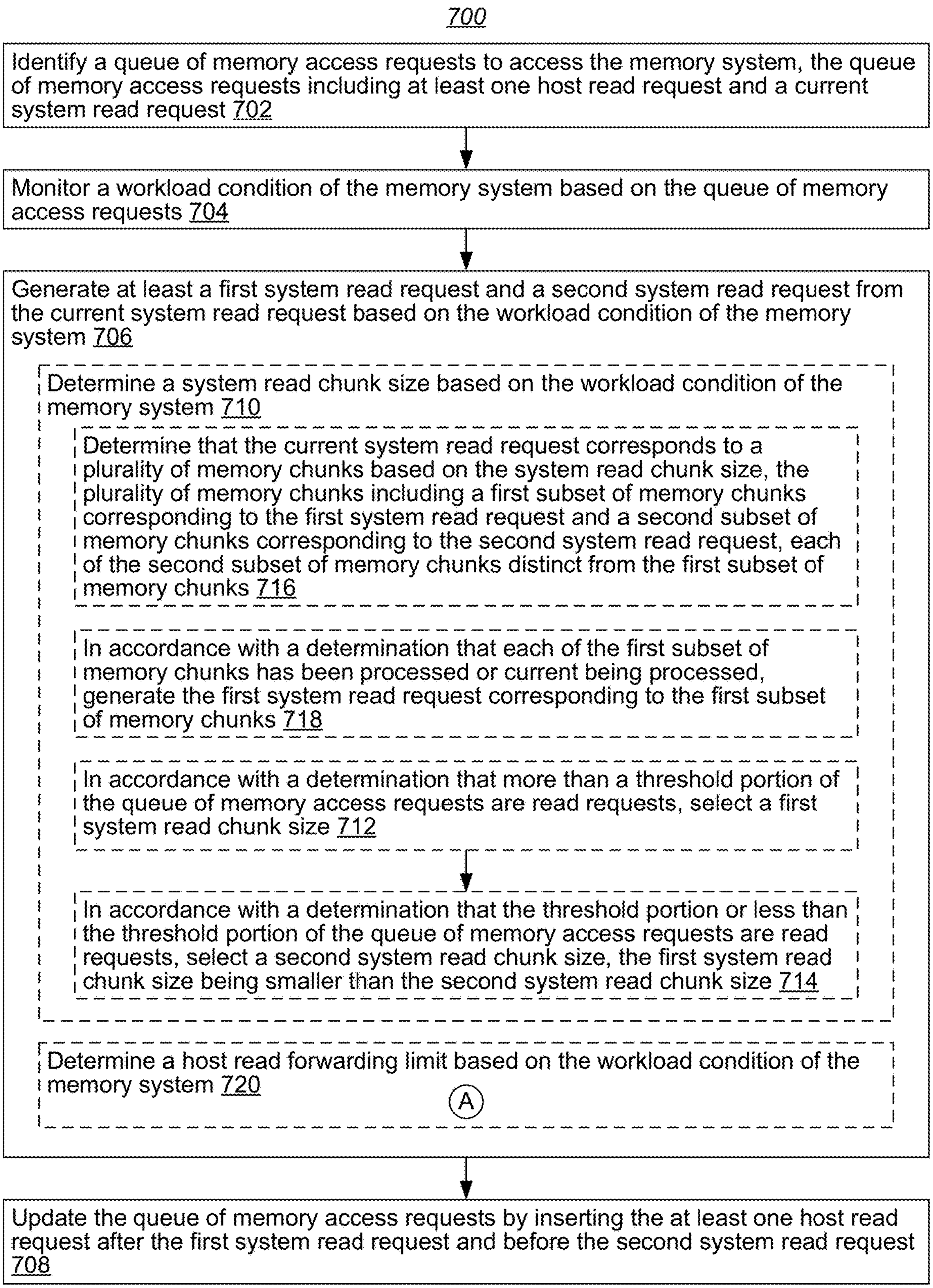
FIGS. 7A and 7B are a flow diagram of a method for controlling access to a memory system, in accordance with some embodiments.
Figure 7B:
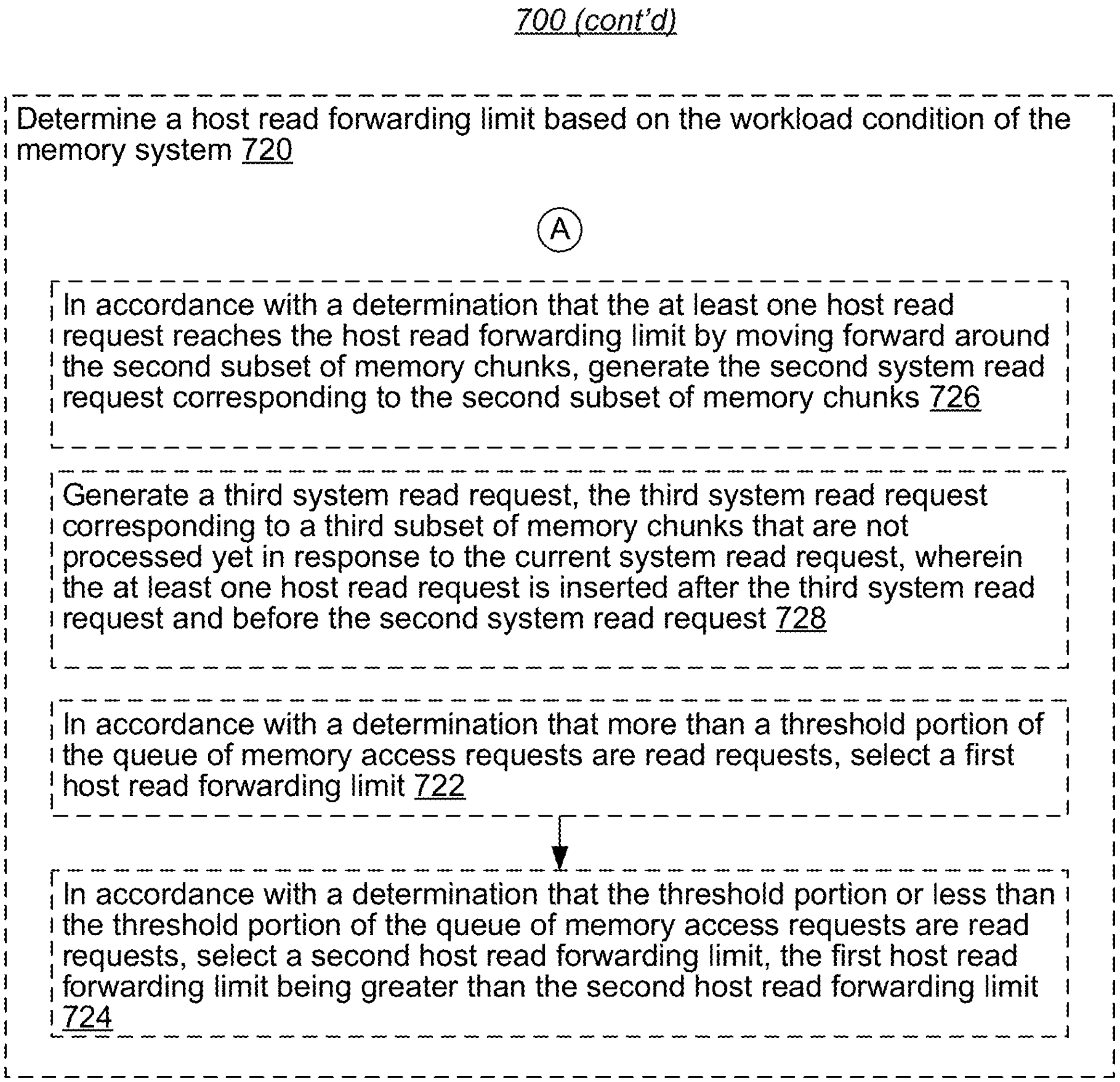

FIGS. 7A and 7B are a flow diagram of a method 700 for controlling access to a memory system 200, in accordance with some embodiments. The method 700 is implemented at an electronic device including the memory system 200 (FIG. 2). The memory system 200 identifies (step 702) a queue 216 of memory access requests to access the memory system 200, and the queue 216 of memory access requests (FIG. 2) includes at least one host read request 404 and a current system read request 402. The memory system 200 monitors (step 704) a workload condition of the memory system 200 based on the queue 216 of memory access requests and generates (step 706) at least a first system read request 402A (FIGS. 4A-4E and 5A-5 #) and a second system read request 402B (FIGS. 4A-4E and 5A-5E) from the current system read request 402 based on the workload condition of the memory system 200. The queue 216 of memory access requests is updated (step 708) by inserting the at least one host read request 404 after the first system read request 402A and before the second system read request 402B.

In some embodiments, the memory system 200 determines (step 710) a system read chunk size based on the workload condition of the memory system 200, and the first and second system read requests 402A and 402B are generated from the current system read request 402 based on the system read chunk size. Further, in some embodiments, the memory system 200 determines the system read chunk size according to a predefined skip check frequency, e.g., every 100 milliseconds. In some embodiments, in accordance with a determination that more than a threshold portion (e.g., 50%) of the queue 216 of memory access requests are read requests, the memory system 200 selects (step 712) a first system read chunk size (e.g., 16 KB). In accordance with a determination that the threshold portion or less than the threshold portion of the queue 216 of memory access requests are read requests, the memory system 200 selects (step 714) a second system read chunk size (e.g., 64 KB). The first system read chunk size is smaller than the second system read chunk size. In some embodiments, the second system read chunk size is a default system read chunk size that matches a memory read size of the current system read request 402. The current system read request 402 is bypassed or processed without being split or divided to accommodate the host read request 404 that follows the current system read request 402. By these means, the host read request 404 does not need to wait for the current system read request 402 to be entirely processed and is moved forward around part of the current system read request 402, thereby reducing a latency time of the host read request 404.

Additionally, in some embodiments, the memory system 200 determines that the current system read request 402 corresponds (step 716) to a plurality of memory chunks 406 (FIG. 4B) based on the system read chunk size. The plurality of memory chunks 406 includes a first subset of memory chunks 406A. The memory system 200 determines that each of the first subset of memory chunks 406A has been processed or is currently being processed. In accordance with a determination that each of the first subset of memory chunks 406A has been processed or current being processed, the memory system 200 generates (step 718) the first system read request 402A corresponding to the first subset of memory chunks 406A.

In some embodiments, the memory system 200 determines that the current system read request 402 corresponds to a plurality of memory chunks 406 based on the system read chunk size. The plurality of memory chunks 406 include a first subset of memory chunks 406A corresponding to the first system read request 402A and a second subset of memory chunks 406B corresponding to the second system read request 402B. Each of the second subset of memory chunks 406B is distinct from the first subset of memory chunks 406A. Additionally, in some embodiments, the plurality of memory chunks 406 include only the first subset of memory chunks 406A and the second subset of memory chunks 406B, and form an entirety of a memory block corresponding to the current system read request 402. Stated another way, the first system read request 402A has a first memory read size, and the second system read request 402B has a second memory read size. The first memory read size is a first multiple of the memory read chunk size, and the second memory read size is a second multiple of the memory read chunk size. The current system read request 402 has a total memory read size, and the total memory read size is equal to a sum of the first memory read size and the second memory read size.

In some embodiments, the memory system 200 determines (step 720) a host read forwarding limit based on the workload condition of the memory system 200. Further, in some embodiments, the memory system 200 determines the host read forwarding limit according to a predefined skip check frequency, e.g., every 100 milliseconds. Additionally, in some embodiments, in accordance with a determination that more than a threshold portion of the queue 216 of memory access requests are read requests, the memory system 200 selects (step 722) a first host read forwarding limit. In accordance with a determination that the threshold portion or less than the threshold portion of the queue 216 of memory access requests are read requests, the memory system 200 selects (step 724) a second host read forwarding limit. The first host read forwarding limit is greater than the second host read forwarding limit.

Additionally, in some embodiments, the memory system 200 determines that the current system read request 402 corresponds to a plurality of memory chunks 406. The plurality of memory chunks 406 includes a second subset of memory chunks 406B that are not processed yet in response to the current system read request 402. In accordance with a determination that the at least one host read request 404 reaches the host read forwarding limit by moving forward around the second subset of memory chunks 406B, the memory system 200 generates (step 726) the second system read request 402B corresponding to the second subset of memory chunks 406B.

In some embodiments, the memory system 200 generates (step 728) a third system read request. The third system read request corresponds to a third subset of memory chunks 406C that are not processed yet in response to the current system read request 402. The at least one host read request 404 is inserted after the third system read request and before the second system read request 402B. In other words, the at least one host read request 404 has reached the host read forwarding limit by moving forward around the second subset of memory chunks 406B, and cannot move further over the third subset of memory chunks 406C. Alternatively, in some embodiments, the memory system 200 identifies a first subset of memory chunks 406A in which each memory chunk has been processed or is currently being processed in response to the current system read request. The first subset of memory chunks cannot be bypassed by the host read request 404. The memory system 200 further identifies a third subset of memory chunks 406C that are not processed yet in response to the current system read request. The first system read request is generated to access both the first subset of memory chunks 406A and the third subset of memory chunks 406C.

In some embodiments, the queue 216 of memory access requests further includes one or more additional system access requests 502 that follow the current system read request 402 and are followed by the at least one host read request 404. The queue 216 of memory access requests is updated by moving the at least one host read request 404 over the one or more additional system access requests 502. After processing the host read request 404, the memory system 200 successively accesses a second subset of memory chunks 406B in response to the second system read request 402B and one or more additional memory blocks in response to the one or more system access requests.

In some embodiments, the memory system 200 includes a solid-state drive (SSD) having a plurality of memory channels, and the queue 216 of memory access requests corresponds to one or more of the plurality of memory channels.

In some embodiments, the memory system 200 determines that the at least one host read request 404 has a memory read size and compares the memory read size with a predetermined host read size. The at least one host read request 404 is inserted after the first system read request 402A and before the second system read request 402B, in accordance with a determination that the memory read size is less than the predetermined host read size. Further, in some embodiments, the memory system 200 includes a plurality of memory chunks 406 corresponding to the current system read request 402. The memory system 200 determines whether each of the plurality of memory chunks 406 has been processed, is currently being processed, or will be processed. Each memory chunk has a system read chunk size, and the predetermined host read size is less than or substantially equal to the system read chunk size.

In some embodiments, the current system read request 402 has a total memory read size of 64 KB and corresponds to four memory chunks 406. Each memory chunk 406 includes 16 KB, and each of the first and second system read requests 402A and 402B has a respective memory read size equal to a respective multiple of 16 KB. In some embodiments, the memory system 200 includes four memory chunks 406. The first system read request 402A corresponds to only a first memory chunk 406A, and the second system read request 402B correspond to three remaining memory chunks 406B in the four memory chunks (FIG. 4C). In some embodiments, the memory system 200 includes four memory chunks, and the first system read request 402A includes only a first memory chunk, and the second system read request 402B corresponds to one or two last memory chunks 406B (FIGS. 4D and 4E) in the four memory chunks.

It should be understood that the particular order in which the operations in FIG. 7 have been described are merely exemplary and are not intended to indicate that the described order is the only order in which the operations could be performed. One of ordinary skill in the art would recognize various ways to enhance the efficiency of processing host read requests in a memory system 200 (e.g., an SSD). Additionally, it should be noted that details of other processes described above with respect to FIGS. 1-6C are also applicable in an analogous manner to method 700 described above with respect to FIG. 700. For brevity, these details are not repeated here.

Memory is also used to storing instructions and data associated with the method 700, and includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 700.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for controlling access to a memory system, implemented at an electronic device, the method comprising:

identifying a queue of memory access requests to access the memory system, the queue of memory access requests including at least one host read request and a current system read request;

determining a system read chunk size based on a workload condition of the memory system;

generating at least a first system read request and a second system read request from the current system read request based on the system read chunk size, including:

determining that the current system read request corresponds to a plurality of memory chunks based on the system read chunk size, wherein the plurality of memory chunks includes a first subset of memory chunks corresponding to the first system read request and a second subset of memory chunks corresponding to the second system read request, each of the second subset of memory chunks distinct from the first subset of memory chunks; and updating the queue of memory access requests by inserting the at least one host read request after the first system read request and before the second system read request.

2. The method of claim 1, generating at least the first system read request and the second system read request further comprising:

determining that the current system read request corresponds to a plurality of memory chunks based on the system read chunk size, the plurality of memory chunks including a first subset of memory chunks;

determining that each of the first subset of memory chunks has been processed or is currently being processed; and in accordance with a determination that each of the first subset of memory chunks has been processed or current being processed, generating the first system read request corresponding to the first subset of memory chunks.

3. The method of claim 1, wherein the plurality of memory chunks include only the first subset of memory chunks and the second subset of memory chunks, and form an entirety of a memory block corresponding to the current system read request.

4. The method of claim 1, determining the system read chunk size based on the workload condition of the memory system further comprising one of:

in accordance with a determination that more than a threshold portion of the queue of memory access requests are read requests, selecting a first system read chunk size; and in accordance with a determination that the threshold portion or less than the threshold portion of the queue of memory access requests are read requests, selecting a second system read chunk size distinct from the first system read chunk size.

5. The method of claim 4, wherein the first system read chunk size is smaller than the second system read chunk size.

6. The method of claim 1, further comprising:

determining a host read forwarding limit based on the workload condition of the memory system.

7. The method of claim 6, generating at least the first system read request and the second system read request further comprising:

determining that the second subset of memory chunks are not processed yet in response to the current system read request; and in accordance with a determination that the at least one host read request reaches the host read forwarding limit by moving forward around the second subset of memory chunks, generating the second system read request corresponding to the second subset of memory chunks.

8. The method of claim 7, further comprising generating a third system read request, the third system read request corresponding to a third subset of memory chunks that are not processed yet in response to the current system read request, wherein the at least one host read request is inserted after the third system read request and before the second system read request.

9. The method of claim 7, further comprising:

identifying the first subset of memory chunks in which each memory chunk has been processed or is currently being processed in response to the current system read request; and identifying a third subset of memory chunks that are not processed yet in response to the current system read request;

wherein the first system read request is generated to access both the first subset of memory chunks and the third subset of memory chunks.

10. The method of claim 6, determining the host read forwarding limit based on the workload condition of the memory system further comprising:

in accordance with a determination that more than a threshold portion of the queue of memory access requests are read requests, selecting a first host read forwarding limit;

in accordance with a determination that the threshold portion or less than the threshold portion of the queue of memory access requests are read requests, selecting a second host read forwarding limit, the first host read forwarding limit being greater than the second host read forwarding limit.

11. The method of claim 1, wherein the queue of memory access requests further includes one or more additional system access requests that follow the current system read request and are followed by the at least one host read request, and updating the queue of memory access requests further includes moving the at least one host read request over the one or more additional system access requests.

12. An electronic device, comprising:

one or more processors; and memory having instructions stored thereon, which when executed by the one or more processors cause the processors to implement operations including:

identifying a queue of memory access requests to access a memory system, the queue of memory access requests including at least one host read request and a current system read request;

determining a system read chunk size based on a workload condition of the memory system;

generating at least a first system read request and a second system read request from the current system read request based on the system read chunk size, including:

determining that the current system read request corresponds to a plurality of memory chunks based on the system read chunk size, wherein the plurality of memory chunks includes a first subset of memory chunks corresponding to the first system read request and a second subset of memory chunks corresponding to the second system read request, each of the second subset of memory chunks distinct from the first subset of memory chunks; and updating the queue of memory access requests by inserting the at least one host read request after the first system read request and before the second system read request.

13. The electronic device of claim 12, wherein the memory system includes a solid-state drive (SSD) having a plurality of memory channels, and the queue of memory access requests corresponds to one or more of the plurality of memory channels.

14. The electronic device of claim 12, wherein the memory further comprises instructions for:

comparing a memory read size of the at least one host read request with a predetermined host read size;

wherein the at least one host read request is inserted after the first system read request and before the second system read request, in accordance with a determination that the memory read size is less than the predetermined host read size.

15. The electronic device of claim 14, the memory system including a plurality of memory chunks corresponding to the current system read request, wherein the memory further comprises instructions for:

determining whether each of the plurality of memory chunks has been processed, is currently being processed, or will be processed, wherein each memory chunk has a system read chunk size, and the predetermined host read size is less than or substantially equal to the system read chunk size.

16. The electronic device of claim 12, wherein the current system read request has a total memory read size of 64 KB and corresponds to four memory chunks, each memory chunk including 16 KB, and each of the first and second system read requests has a respective memory read size equal to a respective multiple of 16 KB.

17. A non-transitory computer-readable storage medium, having instructions stored thereon, which when executed by one or more processors cause the processors to implement operations comprising:

identifying a queue of memory access requests to access a memory system, the queue of memory access requests including at least one host read request and a current system read request;

determining a system read chunk size based on a workload condition of the memory system;

generating at least a first system read request and a second system read request from the current system read request based on the system read chunk size, including:

determining that the current system read request corresponds to a plurality of memory chunks based on the system read chunk size, wherein the plurality of memory chunks includes a first subset of memory chunks corresponding to the first system read request and a second subset of memory chunks corresponding to the second system read request, each of the second subset of memory chunks distinct from the first subset of memory chunks; and updating the queue of memory access requests by inserting the at least one host read request after the first system read request and before the second system read request.

18. The non-transitory computer-readable storage medium of claim 17, wherein the memory system includes a plurality of memory chunks, and the first subset of memory chunks corresponding to the first system read request includes only a first memory chunk.

19. The non-transitory computer-readable storage medium of claim 17, further comprising instructions for:

determining a host read forwarding limit based on the workload condition of the memory system;

determining that the second subset of memory chunks are not processed yet; and based on the host read forwarding limit, generating the second system read request corresponding to the second subset of memory chunks.

* * * * *